United States Patent [19]

Mori

[11] Patent Number: 4,459,643
[45] Date of Patent: Jul. 10, 1984

[54] ARTIFICIAL LIGHT SOURCE ARRANGEMENT

[76] Inventor: Kei Mori, No. 3-16-3-501, Kaminoge, Setagaya-ku, Tokyo, Japan

[21] Appl. No.: 465,290

[22] Filed: Feb. 9, 1983

[30] Foreign Application Priority Data

Feb. 9, 1982 [JP] Japan .................................. 57-19399

[51] Int. Cl.³ .............................................. F21V 7/04
[52] U.S. Cl. ........................................ 362/32; 362/31;
362/224; 362/268; 362/311; 362/330; 362/331;
362/332; 362/335; 362/338
[58] Field of Search .................. 362/31, 32, 224, 268,
362/311, 330, 331, 332, 335, 338

[56] References Cited

U.S. PATENT DOCUMENTS 4,281,366  7/1981  Wurster et al. ........................ 362/32
4,373,178  2/1983  Gulliksen ............................ 362/335

Primary Examiner—Stephen J. Lechert, Jr.
Attorney, Agent, or Firm—Cantor and Lessler

[57] ABSTRACT

An artificial light source arrangement includes a tubular light source whose horizontal light distribution curve takes on a substantial circle, a plurality of elongated linear lenses arranged parallel with the light source, and a plurality of photoconductors, each having its light-receiving end disposed along the focus position of each lens. Lenses may be arranged in coaxial relation to the light source, and the photoconductors may then have their light-receiving ends formed at the focus position of the lenses.

2 Claims, 4 Drawing Figures

ARTIFICIAL LIGHT SOURCE ARRANGEMENT

BACKGROUND OF THE INVENTION

This invention relates to an artificial light source arrangement which is, in particular, of the type that the light emitted from a tubular light source whose horizontal light distribution curve takes on a substantial circle, such as fluorescent lamps or xenon lamps, is focused by a lens system, and the thus converged light is transmitted through a photoconductive cable to a place where lighting is required.

In general, electric bulbs may illuminate every place. With illumination in an explosive atmosphere or in the water, however, the electrical appliance to be applied for that purpose has to be of the explosion-proof or the waterproof type since there is a danger of explosion or short circuits. It is found, however, that currently available appliances of the explosion- or water-proof type are of a large size as well as a large weight and rather costly, and do not function well as far as explosion-proofness and waterproofness are concerned.

SUMMARY OF THE INVENTION

A main object of this invention is therefore to provide a novel artificial light source which is made entirely explosion-proof and waterproof, and provides a heatless light source demanded for the illumination of studios, etc. According to this invention, the light from the artificial light source is transmitted through a photoconductive cable to a place where lighting is required, and the thus transmitted light is radiated from the end of that cable or light-emitting means formed thereat.

According to one aspect of this invention, there is provided an artificial light source arrangement including a tubular light source whose horizontal light distribution curve takes on a substantial circle, a plurality of elongated linear lenses arranged parallel with the said light source, and a plurality of photoconductors, each having its light-receiving end arranged along the focus position of each lens.

According to another aspect of this invention, there is provided an artificial light source arrangement including a tubular light source whose horizontal light distributing curve takes on a substantial circle, a plurality of lenses arranged in coaxial relation to the said light source, and a plurality of photoconductors, each having its light-receiving end formed at the focus position of each lens.

BRIEF DESCRIPTION OF THE DRAWINGS

The aforesaid object and other objects and features of this invention will now become apparent from a reading of the following detailed description with reference to the accompanying drawings, in which.

PREFERRED EMBODIMENT OF THE INVENTION

Figure 1:
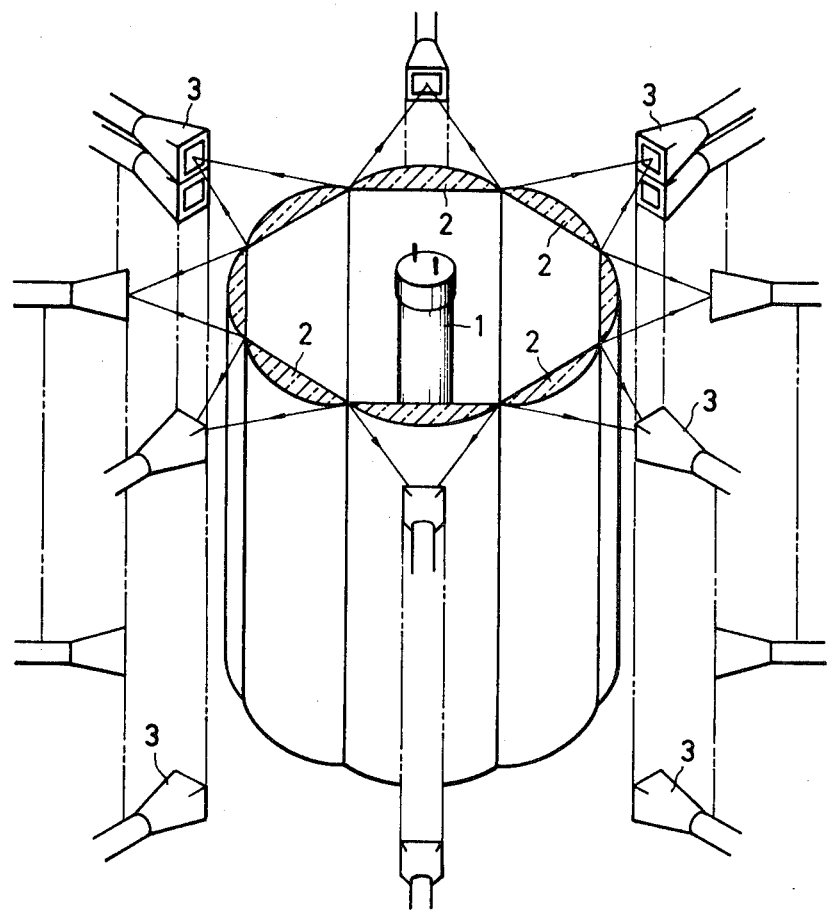
FIG. 1 is a perspective view schematically illustrating one embodiment of the artificial light source arrangement according to this invention.

Referring now to FIG. 1, one embodiment of the artificial light source arrangement according to this invention includes a tubular light source 1 whose horizontal light distribution curve takes on a substantial circle, such as a fluorescent or xenon lamp, a plurality of elongated linear lenses 2 arranged parallel with the source 1, and a plurality of photoconductive cables 3, each having its light-receiving end disposed along the focus position of each lens. With the arrangement constructed as above, the light from the light source 1 can effectively be admitted into the respective cables 3, and transmitted therethrough to the desired place where it can be used as, for instance, a light source for the illumination of levels or drifts, for the luring of fishes, or for the illumination of a closed tank for the promotion of photosynthesis of chlorella, etc.

Figure 2:
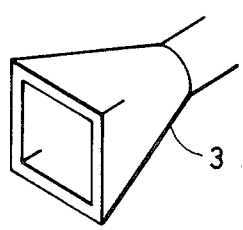
FIG. 2 is a perspective view illustrative of one embodiment of the light-receiving end of a photoconductive cable.

The light converged by the lens system 2 may be introduced into the cables 3 in a variety of manners. As shown in FIG. 2 as an example, the light-receiving end of the cable 3 is shaped into a rectangular barrel which is converged through its transient portion to the circular photoconductor rod or tube, so that the arrangement and alignment of the light-receiving ends of the cables 3 are facilitated, and the light is effectively admitted from the light source 1 to those cables.

It is noted that, for more effective introduction of light into the photoconductors, the light-receiving ends may be loaded or packed therein with a material having its index of refraction equal to, or smaller than, that of the cables.

Figure 3:
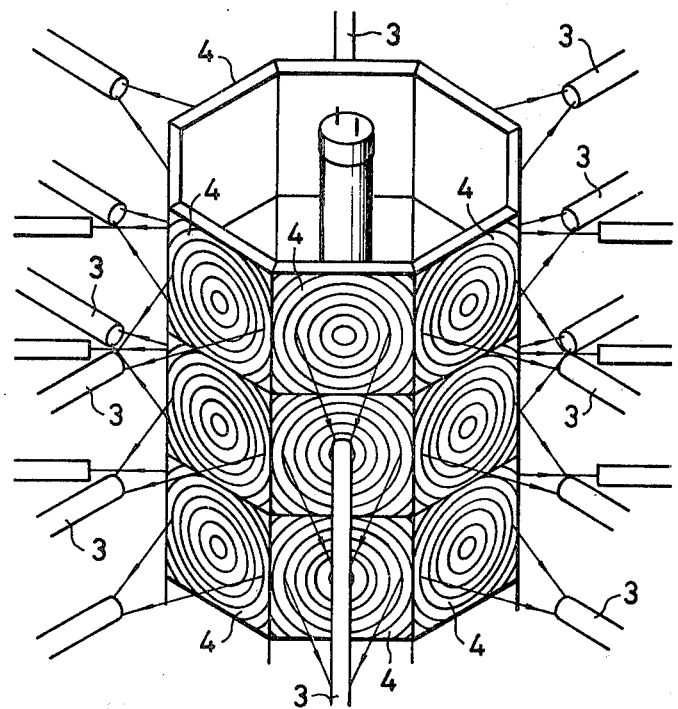
FIG. 3 is a perspective view schematically illustrating another embodiment of this invention.
Figure 4:
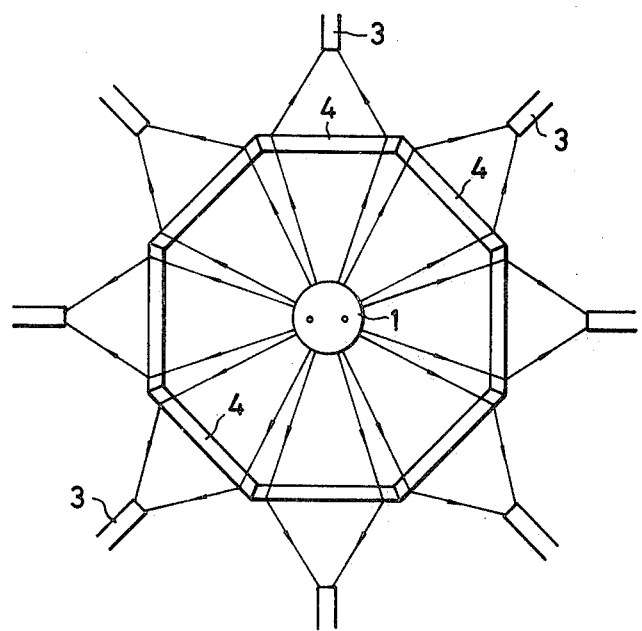
FIG. 4 is a plan view of FIG. 3.

Another embodiment of this invention will now be explained with reference to FIGS. 3 and 4.

A tubular light source is surrounded with a plurality of lenses 4, at the focus position of each of which is disposed the light-receiving end of a photoconductor cable 3. Although not illustrated in FIGS. 1 and 2 showing part of this invention, the lenses 2 and 4 and the light-receiving ends of the photoconductor cables 3 are designed to be mounted on a frame disposed in coaxial relation to the tubular light source 1. If the position of the light-receiving ends of the cables 3 is adjustable in respect of the lenses, it is then possible to accurately locate the light-receiving end of individual cable at the focus position of the lens system, or at the focus of light with a desired wavelength component, so that the light having a desired wavelength component can be transmitted.

Alternatively, achromatic lenses may be employed for the transmission of light with its all wavelength components.

While this invention has been described in connection with its preferred embodiments, it will be understood that many changes or modifications may be added thereto without departing from the scope defined in the appended claims.

What is claimed is:

1. An artificial light source arrangement including a tubular light source means whose horizontal light distribution curve takes on a substantial circle, a plurality of elongated linear lens means arranged parallel with the said light source means and surrounding the same, and a plurality of photoconductor means disposed in a linear array along each of said lens means with their light-receiving ends disposed along the focus position of each of said lens means.

2. An artificial light source arrangement including a tubular light source means whose horizontal light distributing curve takes on a substantial circle, a plurality of lens means surrounding said light source means in coaxial relation to the said light source means, and a plurality of photoconductor means disposed adjacent said lens means, each having its light-receiving end located at the focus position of one of said lens means.

* * * * *